United States Patent [19]
Verboom

[11] Patent Number: 5,270,991
[45] Date of Patent: Dec. 14, 1993

[54] TRACK FORMAT FOR USE WITH AN OPTICAL RECORD CARRIER HAVING A VARYING TRACK PITCH

[75] Inventor: Johannes J. Verboom, Black Forest, Colo.

[73] Assignee: North American Philips Corporation, New York, N.Y.

[21] Appl. No.: 546,390

[22] Filed: Jun. 29, 1990

[51] Int. Cl.⁵ .............................................. G11B 7/00
[52] U.S. Cl. .............................. 369/44.26; 369/275.3
[58] Field of Search ............... 369/44.26, 44.34, 275.1, 369/275.3, 275.4

[56] References Cited

U.S. PATENT DOCUMENTS

| | | | |
|---|---|---|---|
| 4,118,734 | 10/1978 | Bouwhuis et al. | 369/275.3 |
| 4,456,981 | 6/1984 | Silvy et al. | 360/77.07 |
| 4,779,253 | 10/1988 | Getreuer et al. | 369/44.26 |
| 4,839,882 | 6/1989 | Janssen | 369/275.1 |
| 4,858,221 | 8/1989 | Romeas | 369/275.3 |
| 4,932,017 | 6/1990 | Van Vijen | 369/48 |
| 5,012,460 | 4/1991 | Popovich et al. | 369/44.26 |
| 5,034,940 | 7/1991 | Saito et al. | 369/44.34 |
| 5,073,880 | 12/1991 | Maeda et al. | 369/44.26 |

FOREIGN PATENT DOCUMENTS 3833314 4/1990 Fed. Rep. of Germany ... 369/44.26

Primary Examiner—Aristotelis Psitos
Assistant Examiner—P. W. Huber
Attorney, Agent, or Firm—David R. Treacy

[57] ABSTRACT

The present invention provides a track format for an optical record carrier that is useful in producing a tracking signal with a substantially constant slope at its zero-crossing point for a range of track pitches. The preferred embodiment of track format is also useful in producing a tracking signal that has a substantially constant amplitude over a range of track pitches. The track format, in the preferred embodiment, employs wobbled pits. The sequence in which the wobbled pits occur alternates between adjacent tracks and the offset of the wobbled pits with respect to the center line of a track remain constant regardless of the track pitch. The preferred embodiment of the track format also includes a reference pit that is used to establish the threshold detection level for the read electronics. The location of the reference alternates between tracks to reduce the effect of radial interference on the signal produced using the reference pit and thereby allow an optimal threshold level to be established.

10 Claims, 11 Drawing Sheets

TRACK FORMAT FOR USE WITH AN OPTICAL RECORD CARRIER HAVING A VARYING TRACK PITCH

BACKGROUND OF THE INVENTION

1. Field of the Invention

The present invention relates to an optical record carrier and, in particular, to a track format for use with an optical record carrier having a changing track pitch.

2. Description of the Related Art

The signal to noise ratio of an optical record carrier is dependent upon the density of the pits established on the optical record carrier. As the density of the pits increases, the signal produced by any one pit is increasingly affected by the signals produced by adjacent pits and eventually reaches a point where the signal produced by one pit cannot be distinguished from the signal produced by another pit.

With respect to optical disks, the effect of adjacent pits on a defined pit is typically broken down into a radial component and a tangential component. Providing the sum of the radial component and the tangential component does not exceed, for any point on the recording surface of the optical disk, the threshold at which the signal to noise ratio becomes unacceptable, then the density of the pits and the storage capacity of the disk can be increased.

One method, known as the CAV method, of recording data on an optical disk involves rotating the disk at a constant angular velocity and transferring data at a constant frequency from the write head to the optical disk. One consequence of rotating the disk at a constant angular velocity is that the linear velocity of the disk with respect to the write head increases as the distance of the write head from the center of the disk increases. For example, the velocity of a point on the innermost track with respect to the write head when the write head is established over the innermost track is substantially less than the velocity of a point on the outermost track relative to the write head when the write head is established over the outermost track. Since the rate at which data is transferred from the write head to the disk is constant and the linear velocity of the disk increases as the write head moves away from the center of the disk, the density of pits established on the disk decreases as the write head moves away from the center of the disk. This decrease in the density of pits as the write head moves away from the center of the disk results in a reduction in the tangential component of interference. Consequently, for a given signal to noise ratio, the storage capacity of the optical disk can be maximized by decreasing the track pitch (the radial distance between center lines of adjoining tracks) as the radius of the tracks increases and, as a consequence, increasing the radial interference.

Typically, tracking or following of a particular track on an optical disk is accomplished by generating a tracking signal that is based on the interaction of a laser beam with a structure on the optical disk that defines the track and then using the tracking signal to appropriately alter the position of the read/write head with respect to the optical disk. With reference to FIG. 1A, a known track structure for use in generating a tracking signal is illustrated for two different track pitches. The track structure includes a pair of wobbled pits, a first pit offset to one side of a track and a second pit offset to the other side of the track. Each track is partitioned into a data field where user data is recorded and a servo field where the wobbled pits are recorded. The servo fields and the data fields associated with one track are radially aligned with the servo fields and data fields of adjacent tracks. Moreover, the sequence of wobbled pits associated with one track, when viewed from the boundary between the servo field and the data field, is the same from track to track. Consequently, as the track pitch decreases, the pits begin to run together. Moreover, the amplitude of the tracking signal, which is formed by taking the difference between the signals produced using the first and second pits of a track, decreases. This decrease in amplitude limits the resolution that can be attained with the tracking signal, i.e., the ability to distinguish one track from another track, as the track pitch decreases. The change in amplitude of the tracking signal is illustrated in FIG. 1B for the two track pitches shown in FIG. 1A. The wobbled pits are also offset from the center lines of the tracks by ¼ of the track pitch. Consequently, as the track pitch decreases, the offset of the wobbled pits with respect to the center lines of the tracks also decreases. This decrease in the offset changes the slope of the tracking signal at its zero-crossing point, the point at which the read/write head is centered over the track. Unfortunately, changes in the slope of the tracking signal at the zero-crossing point also change the gain of the tracking servo loop and, as a consequence, affect the stability of the tracking servo loop. FIG. 1B illustrates the difference in the slopes of the tracking signals at the zero-crossing points for the two different track pitches shown in FIG. 1A. To compensate for the change in slope and stabilize the servo loop, compensating gain circuitry that amplifies the tracking signal based on the track pitch is incorporated into the servo loop.

FIG. 2A shows another known wobbled pit track format at two different track pitches. Characteristic of this wobbled pit track format is that adjacent tracks share a pit. Consequently, the wobbled pits that are radially aligned with respect to one another are always separated by more than a track pitch. This results in a tracking signal, as illustrated in FIG. 2B, that has a substantially constant amplitude over a range of track pitches. The wobbled pits in this track format, however, are always offset from the center lines of the tracks by one half of the track pitch. Consequently, as the track pitch decreases, the offset or distance between the pits and the track center lines also decreases. As with the track format shown in FIG. 1A, this decrease in the offset of the pits with respect to the center lines of the tracks results in a change in the slope of the tracking signal at the zero-crossing point that adversely affects the gain and stability of the tracking servo loop and, as a consequence, requires the incorporation of compensating gain circuitry into the servo loop.

Tracks on optical disks, in addition to including structures for use in generating tracking signals, also typically incorporate reference marks that are established on the track at the same time that user data is recorded on the track and are primarily used to adjust the threshold level that the read electronics uses to determine whether or not a mark of user data has been read from the disk. Adjustment of the threshold level is required to compensate for changes in the signals produced by the marks of user data. These changes are due to variations or fluctuations in the optical media and the like. Incidentally, the reference marks can also be used to adjust the phase of the channel clock, i.e., the clock used to coordinate the transfer of data to and from the optical disk. Presently, known optical disks employ reference marks that are radially aligned from track to track. An example of such a disk is disclosed in U.S. Pat. No. 4,932,017, which issued on Jun. 6, 1990, and is entitled "Method and Apparatus for Reading and Writing Information on a Recording Medium". While the noted patent indicates that the reference marks are to be situated freely so that the decision level or threshold level is not affected by crosstalk caused by adjacent marks, it is believed that the crosstalk referred to is tangential interference and not radial interference. A draw-back associated with using reference marks that are, in the case of an optical disk, radially aligned with one another is that the radial interference between reference marks increases as the track pitch decreases and, as a consequence, the ability to set a reliable threshold detection level diminishes.

Based on the foregoing, there is a need for a track format that can be used to generate a tracking signal that has a substantially constant slope at its zero-crossing point over a range of track pitches without the need for compensating gain circuitry. Moreover, a track format that possesses a constant amplitude over a range of track pitches is also desirable. Additionally, there is a need for track format that can be used to generate a signal that is 90° out of phase with respect to the tracking signal and, as such, can be used to facilitate track capture. There is a further need for track format where the signal produced using the reference marks is less susceptible to radial interference and, as a consequence, produces a more reliable threshold detection level.

SUMMARY OF THE INVENTION

The present invention provides a track format for an optical record carrier that is useful in producing a periodic tracking signal that has a substantially constant slope at its zero-crossing point over a range of track pitches. By contributing to the production of a tracking having a substantially constant slope at a zero-crossing point over a range of track pitches, the track format of the present invention keeps the gain of the tracking servo loop substantially constant and, as a consequence, stabilizes the tracking servo loop. Moreover, since the gain of the tracking servo loop is substantially constant, the need for circuitry that compensates for changes in the gain of the servo loop is reduced. The preferred embodiment of the track format also results in the tracking signal having a substantially constant amplitude over a range of track pitches that improves the resolution of the tracking signal, i.e., the ease with which one track can be distinguished from another track.

For use in producing a tracking signal having a substantially constant slope and/or amplitude for a range of track pitches, the preferred embodiment of the track format employs wobbled pits that are offset from the track center by the same amount regardless of changes in the track pitch. In addition, the sequence of wobbled pits associated with one track alternates with respect to the sequence of wobbled pits associated with an adjacent track when viewed from corresponding reference points on each track. For example, if the first wobbled pit encountered when proceeding from a defined reference point on a first track is offset to a first side of a first track and precedes a second wobbled that is offset to the second side of the first track, then the first wobbled pit encountered when proceeding from a corresponding reference point on a second track that is adjacent to the first track is offset to the side of the second track that corresponds to the second side of the first track. The second wobbled pit encountered on the second track is offset to the side of the second track that corresponds to first side of the first track and follows the first pit when viewed from a corresponding reference point. In the preferred embodiment of the track format, the distances separating the wobbled pits associated with the first track from the defined reference point are substantially equal to the distances separating the wobbled pits associated with the second track from the corresponding reference point on the second track.

The effect of the wobbled pit portion of the track format is that a tracking signal can be produced where, as the track pitch increases, the zero-crossing portions of the tracking signal remain substantially unchanged while the portions of the tracking signal that are located intermediate to the zero-crossing portions become increasingly flatter, while remaining at a substantially constant amplitude.

The preferred embodiment of the invention also includes "cosine" pits that are useful in producing a "cosine" signal that is 90° out of phase with the "sine" signal produced using the wobbled pits. The "cosine" signal can be used in combination with the "sine" signal to determine which direction, radially, the laser beam is moving with respect to the optical record carrier and thereby facilitate track capture. In the preferred embodiment, each track includes a servo field that, in turn, includes a "cosine" pit that is located substantially on the center line of the track. The location of the "cosine" pit alternates between adjacent tracks when viewed from corresponding reference points on each track. For example, if the "cosine" pit associated with a first track is located a first distance from a defined reference point, then the "cosine" pit associated with a second track that is adjacent to the first track will be located a second distance from a corresponding reference point and a third "cosine" pit associated with a third track that is adjacent to the second track will be located a distance from a corresponding reference point that is substantially equal to the distance between the first "cosine" pit and the reference point of the first track.

The preferred embodiment of the track format further includes a reference mark that is used to establish a threshold level for the detection electronics that is reliable over a range of track pitches. The location of the reference mark alternates between adjacent tracks relative to corresponding reference points on each track. By alternating the location of the reference marks from track to track, the radial interference between reference marks on adjacent tracks is reduced and, as a consequence, a reliable threshold level can be established over a range of track pitches. In addition, the reference marks can be used to adjust the phase of the channel clock.

DETAILED DESCRIPTION OF THE PREFERRED EMBODIMENT

The present invention provides a track format for an optical record carrier that is useful in producing a periodic tracking signal that has a substantially constant slope at its zero-crossing point for a range of track pitches. In addition, the periodic tracking signal produced using the preferred embodiment of the track format also has a substantially constant amplitude over a range of track pitches.

Figure 3:
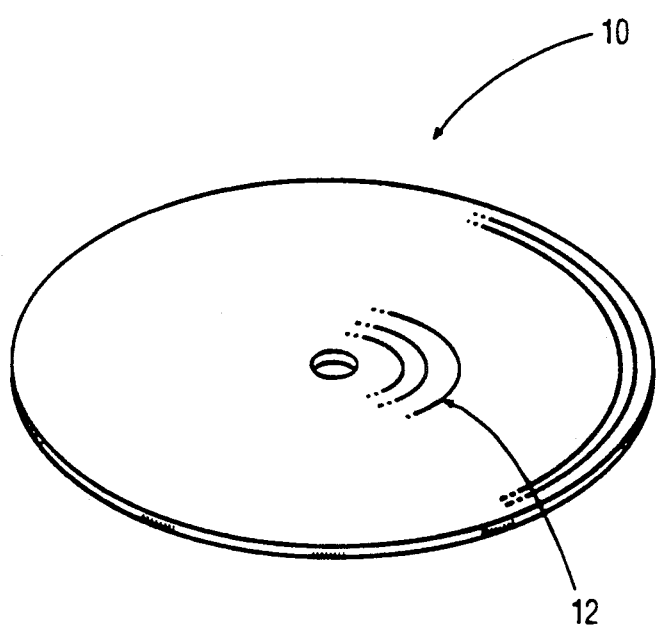
FIG. 3 illustrates an optical disk with a track pitch that decreases as the radius of the tracks increases.

With reference to FIG. 3, the preferred embodiment of the invention includes an optical disk 10. However, it should be appreciated that the present invention can also be used with other optical record carriers, such as optical tape and optical drums, if the need should arise. The optical disk 10 includes a plurality of concentric tracks where the track pitch, i.e., the distance between tracks, decreases as the distances of the tracks from the center of the disk or the radiuses of the tracks increases. Alternatively, a spiral track can be utilized where the track pitch decreases as the radius of the spiral increases. By varying the track pitch of the concentric tracks 12, the storage capacity of the disk 10, when used with a constant angular velocity (CAV) disk system where the disk 10 is rotated at a constant angular velocity and information is established on the disk at a substantially constant frequency, can be maximized.

Figure 4:
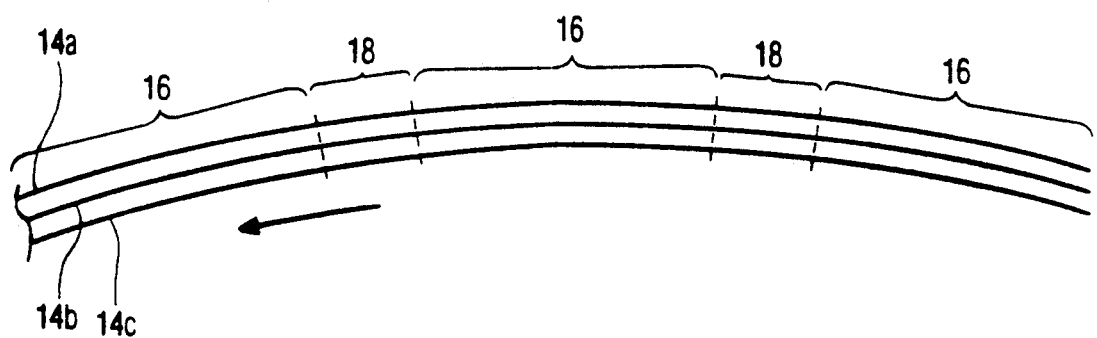
FIG. 4 illustrates the radial alignment of the data fields and servo fields associated with three adjacent tracks of the optical disk illustrated in FIG. 3.

FIG. 4 illustrates portions of three consecutive tracks, tracks 14A–C, of the concentric tracks 12 located on the optical disk 10. Each of the tracks 14A–C are partitioned into a plurality of data fields 16 in which user information can be recorded and a plurality of servo fields 18 in which servo information is established. The data fields 16 and the servo fields 18 associated with track 14A are radially aligned with the data fields 16 and servo fields 18 of tracks 14B and 14C.

Figure 5A:
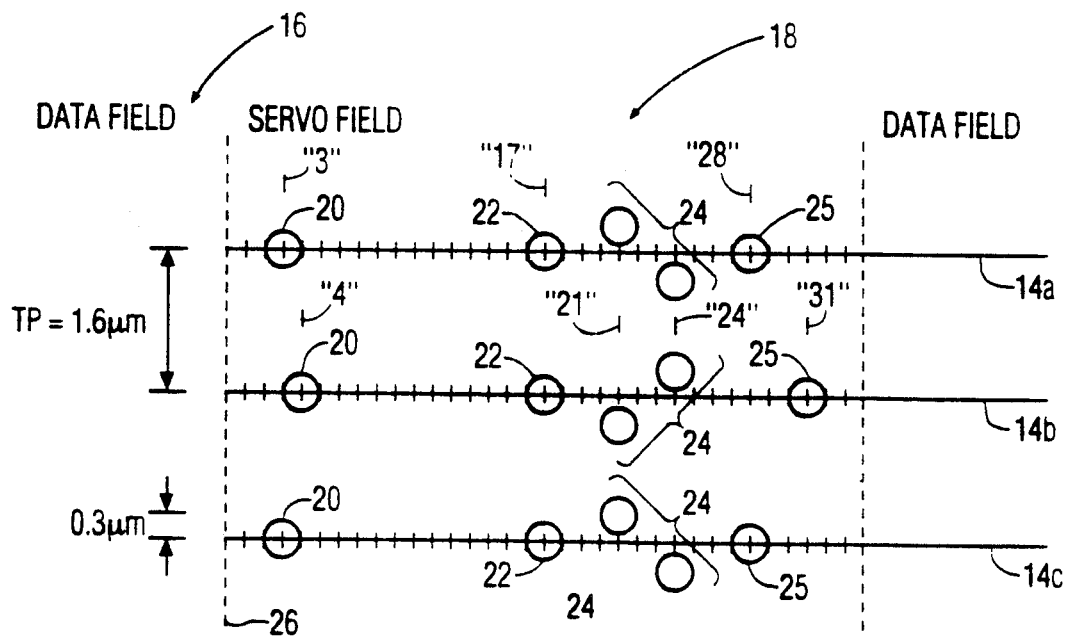
FIG. 5A illustrates, for a track pitch of 1.6 μm, a preferred embodiment of the invention where the sequence of wobbled pits alternates between adjacent tracks and the offset of the wobbled pits with respect to the center line is constant regardless of track pitch.

FIG. 5A illustrates the preferred embodiment of the servo field 18. Each servo field includes a "cosine" pit 20 that is located substantially on the center line of the track and is used to generate a periodic signal that can be used to facilitate track capture. The servo field 18 also includes a qualifier pit 22 that is also located substantially on the center line of the track and is separated from the "cosine" pit 20 by a distance that, when the signals produced by the servo field 18 are processed, allows the servo field 18 to be distinguished from the data field 16; Typically, the area intermediate the "cosine" pit 20 and the qualifier pit 22 is used to generate a signal for adjusting the focus servo loop. The servo field also includes a pair of wobbled pits 24 that are each offset from the track center by a constant distance regardless of the track pitch. In addition, the servo field 18 includes a reference mark 25, that is established in the servo field 18 at the same time that user data is established in the data field. The term "pit", as used in this specification, generally refers to preformatted information established on the optical disk 10 and the term "mark", as used in this specification, generally refers to information, such as user data, that is established on a preformatted optical disk, i.e., after the pits have been established on the optical disk 10. The reference mark 25 is used to generate a threshold detection level that, when the user data is read, allows the detection electronics to determine whether or not a mark of user data has been read. This is necessary because the signal produced by the mark of user data may vary from place to place on the optical disk 10 due to variations in the optical media and the like. The reference mark 25 is also used to adjust, if necessary, the phase of the channel clock.

The servo field 18 is "33" pit locations in length in the preferred embodiment. Relative to a boundary 26 between the servo field 18 and the data field 16, the "cosine" pit 20 is alternatingly located at pit locations "3" and "4". For example, the "cosine" pit 20 that is associated with track 14A is located at pit location "3" relative to the boundary 26; the "cosine" pit 20 that is associated with track 14B, which is adjacent to track 14A, is located at pit location "4" relative to the boundary 26; and the "cosine" pit 20 that is associated with track 14C is located at pit location "3" relative to the boundary 26. By alternating the location of the "cosine" pit 20 between tracks, a periodic "cosine" signal can be generated based upon the interaction of a laser beam with the "cosine" pits when the laser beam is moved radially across the disk 10.

The qualifier pits 22, in the preferred embodiment of the servo field 18, are located at pit location "17" relative to the boundary 26.

Each of the pairs of wobbled pits 24 includes one pit that is located at pit location "21" relative to the boundary 26 and another pit that is located at pit location "24" relative to the boundary 26. The sequence of the pairs of wobbled pits 24 alternates between tracks and, as a consequence, repeats every two tracks. For example, the first wobbled pit encountered when proceeding from the boundary 26 along track 14A is disposed on the upper side of track 14A and the second, subsequently encountered pit is located on the lower side of track 14A. In contrast, the first wobbled pit encountered on track 14B when proceeding from the boundary 26 is established on the lower side of track 14B and the second wobbled pit encountered is disposed on the upper side of track 14B. The pair of wobbled pits 24 associated with track 14C occur in the same sequence as the pair of wobbled pits 24 that are associated with track 14A. Consequently, the sequence in which the pairs of wobbled pits 24 occur in the servo areas 18 is different between adjacent tracks but repeats every two tracks.

The reference pits 25 are alternatingly located at pit locations "28" and "31" of the servo field 18.

Figure 1A:
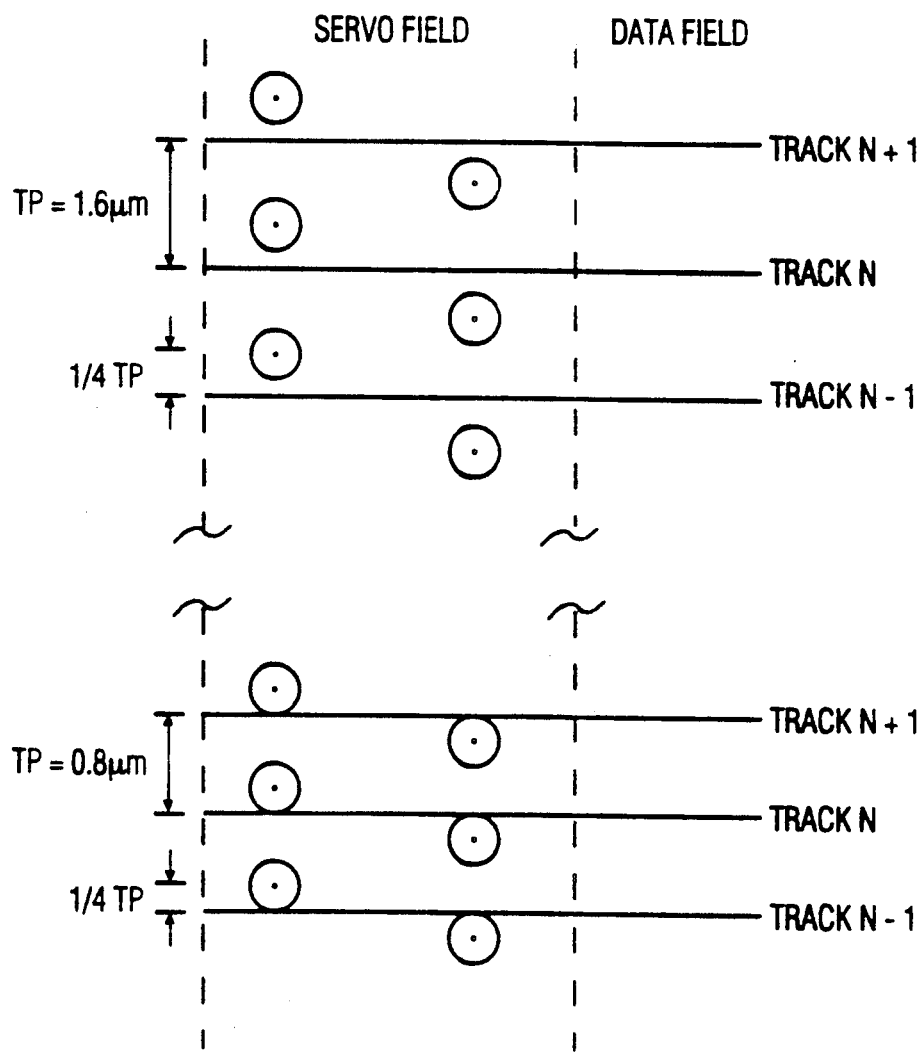
FIG. 1A illustrates, for track pitches of 1.6 $\mu$m and 0.8 $\mu$m, a known wobbled pit track format where the sequence of wobbled pits remains the same from track to track and the offset of the wobbled pits with respect to the center line is a function of the track pitch.
Figure 1B:
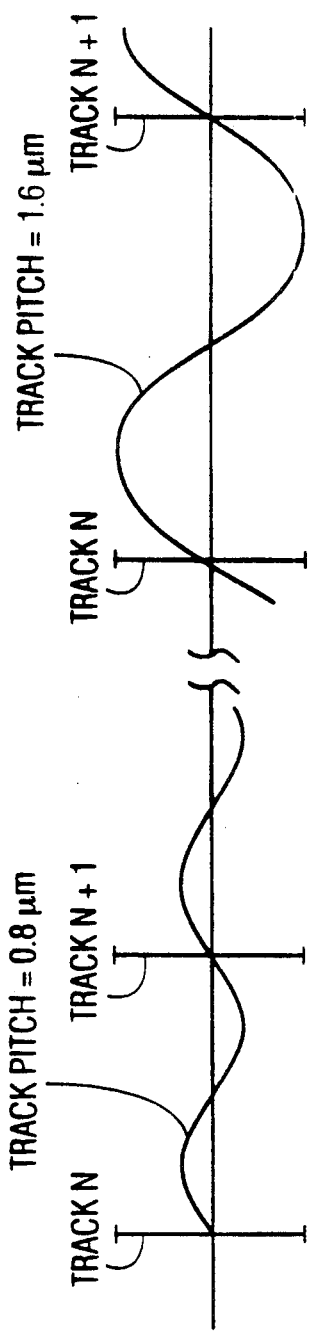
FIG. 1B illustrates the two tracking signals, one for a track pitch of 1.6 $\mu$m and the other for a track pitch of 0.8 $\mu$m, produced when the wobbled pit track format shown in FIG. 1A is used.
Figure 2A:
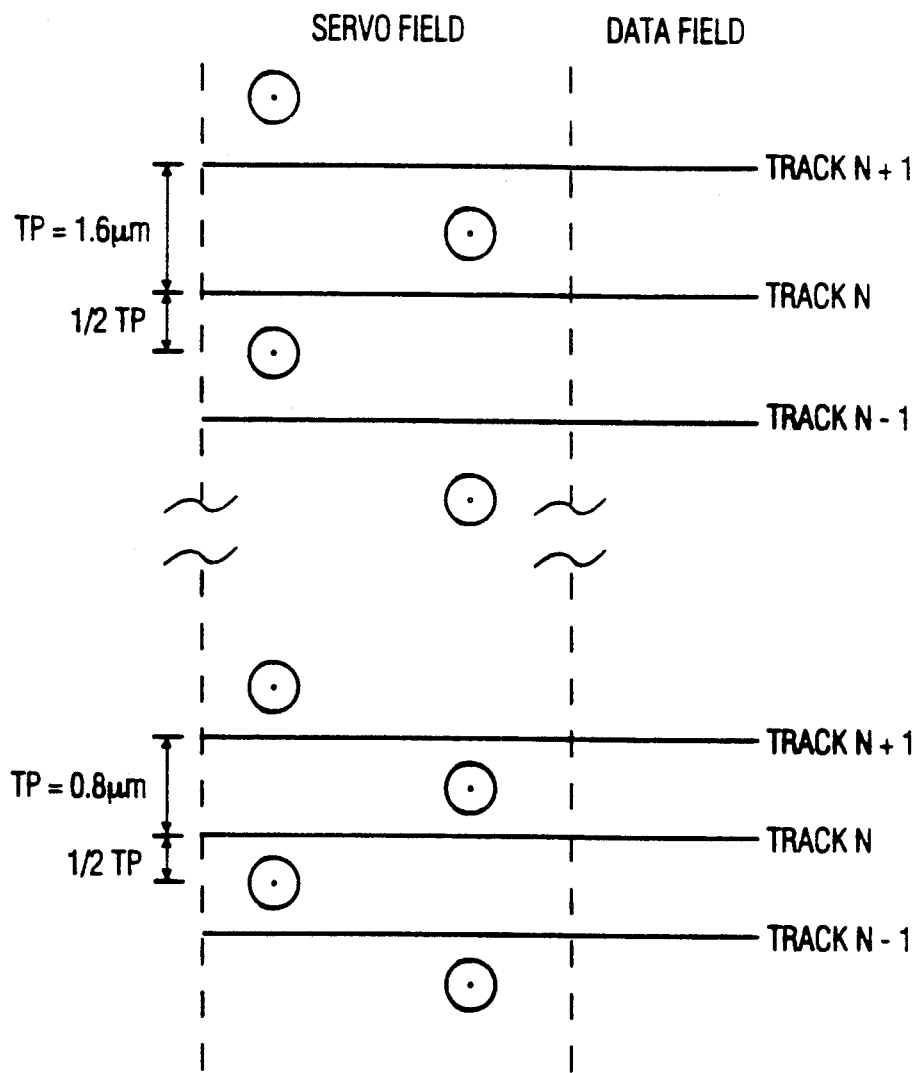
FIG. 2A illustrates, for a track pitches of 1.6 μm and 0.8 μm, another known wobbled pit track format where adjacent tracks share a wobbled pit placed midway between the tracks.
Figure 2B:
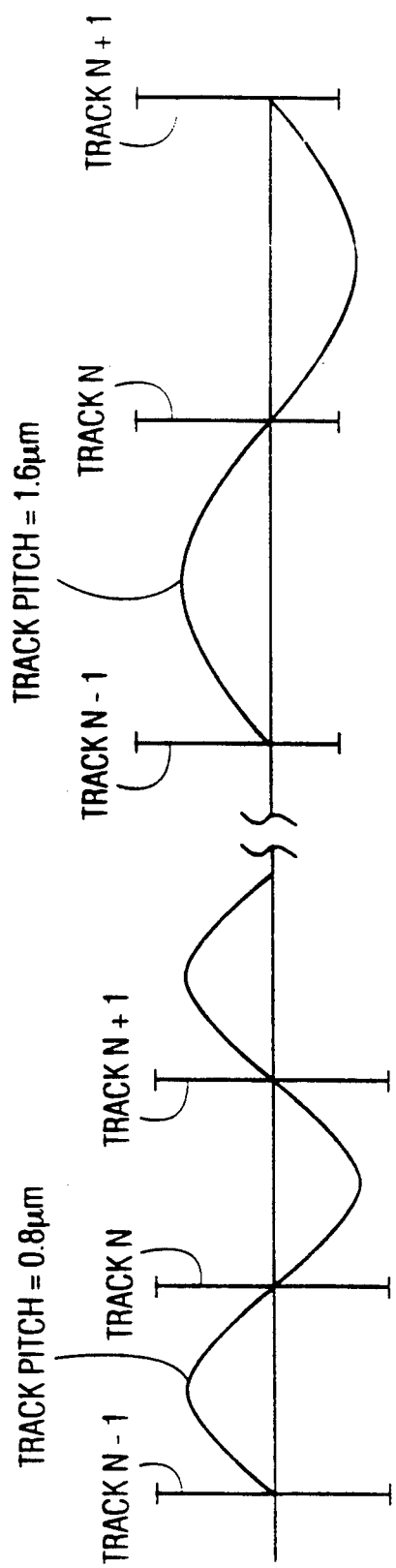
FIG. 2B illustrates the two tracking signals, one for a track pitch of 1.6 μm and the other for a track pitch of 0.8 μm, produced when the wobbled pit track format shown in FIG. 2A is used.
Figure 5B:
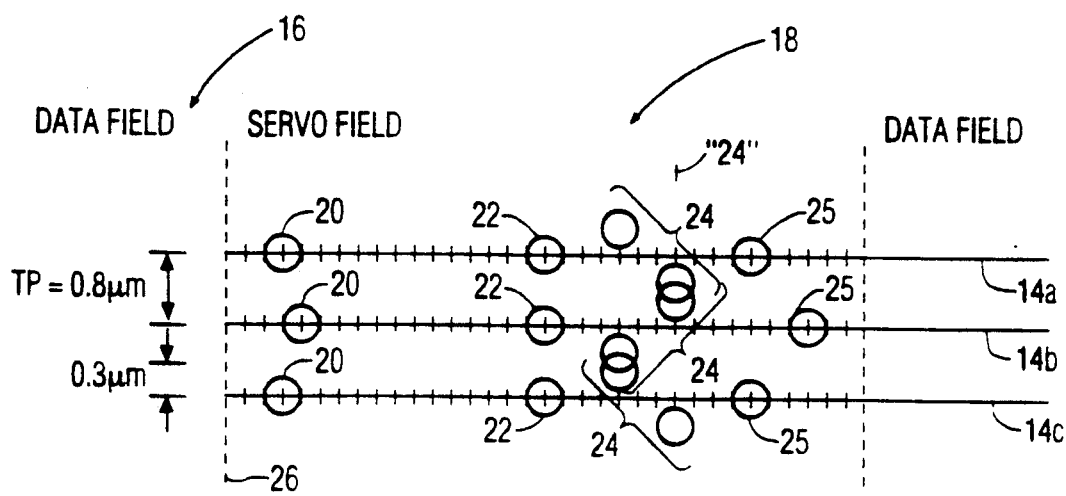
FIG. 5B illustrates the preferred embodiment of the wobbled pit track format for a track pitch of 0.8 μm.

FIG. 5A illustrates the preferred format of the wobbled pits 24 when the track pitch is 1.6 μm. FIG. 5B illustrates the preferred format of the wobbled pits 24 when the track pitch is decreased to 0.8 μm. Noticeably, as the track pitch decreases, the wobbled pits at pit location 24 of the tracks 14A and 14B begin to overlap. Ultimately, if the track pitch were to be reduced to 0.6 μm for a constant offset of 0.3 μm, the wobbled pits would completely overlap and would have a format substantially identical to that shown in FIG. 2A.

Figure 6:
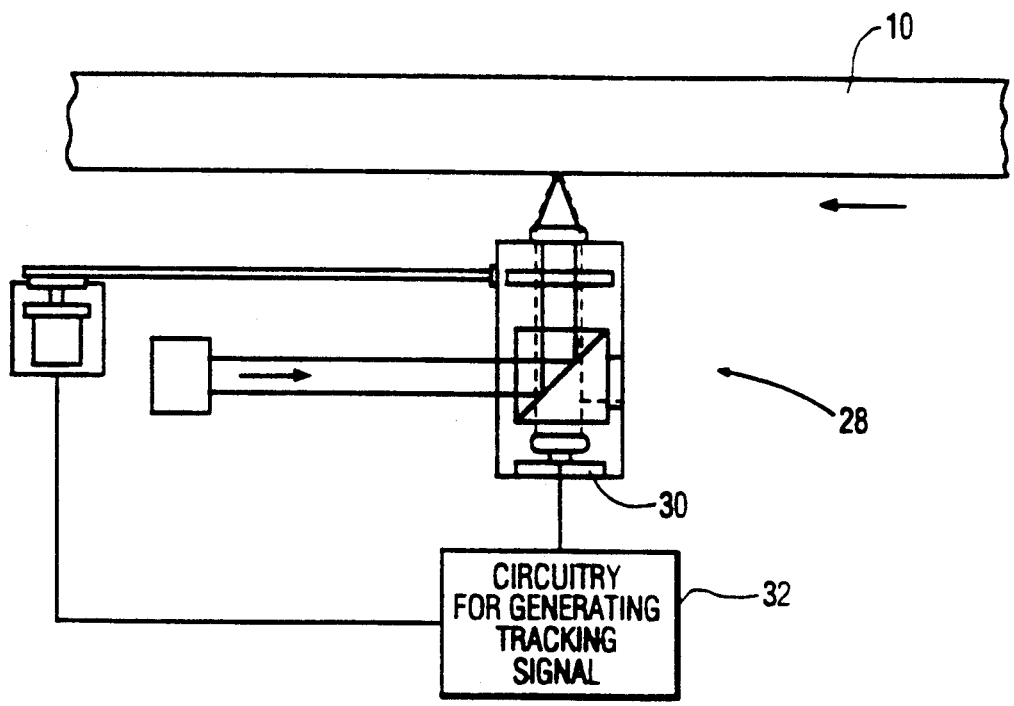
FIG. 6 illustrates the optical read/write head that is used to retrieve information stored on the optical disk.

In operation and with reference to FIG. 6, the optical disk 10 is rotated at a constant angular velocity by a motor (not shown). A read/write (R/W) head 28 that is capable of radial movement with respect to the optical disk 10 is used to read the information established in the servo fields 18 as the R/W head 28 moves radially across the concentric tracks 12. The operation of the R/W head 28 is well-known in the art and, as a consequence, will only be described in the most general terms. The R/W head 28 generates a laser beam, directs the laser beam to the optical disk 10, where the laser beam interacts or is modulated by the pits established in the servo fields 18, and receives the modulated laser beam from the optical disk 10. The modulated laser beam is applied to a photodetector 30 that converts the modulated laser beam into an electrical signal that is then applied to processing circuitry 32 to generate, among other signals, a tracking signal. The circuitry for generating a tracking signal based upon the signals produced by wobbled pits is well-known in the art. For example, suitable circuitry for detecting the wobbled pits 24 is shown in U.S. patent application No. 4,879,707, which is entitled "Optical Disk Tracking and Seeking Systems, Specific Track Format Using Discontinuities", assigned to the assignee of the present invention, and incorporated herein by reference. This circuitry does not include compensating gain circuitry because it is used with an optical record carrier having a substantially constant track pitch. The tracking signal produced by the processing circuitry 32 is used to adjust the radial position of the R/W head 28 relative to the optical disk 10.

Figure 7:
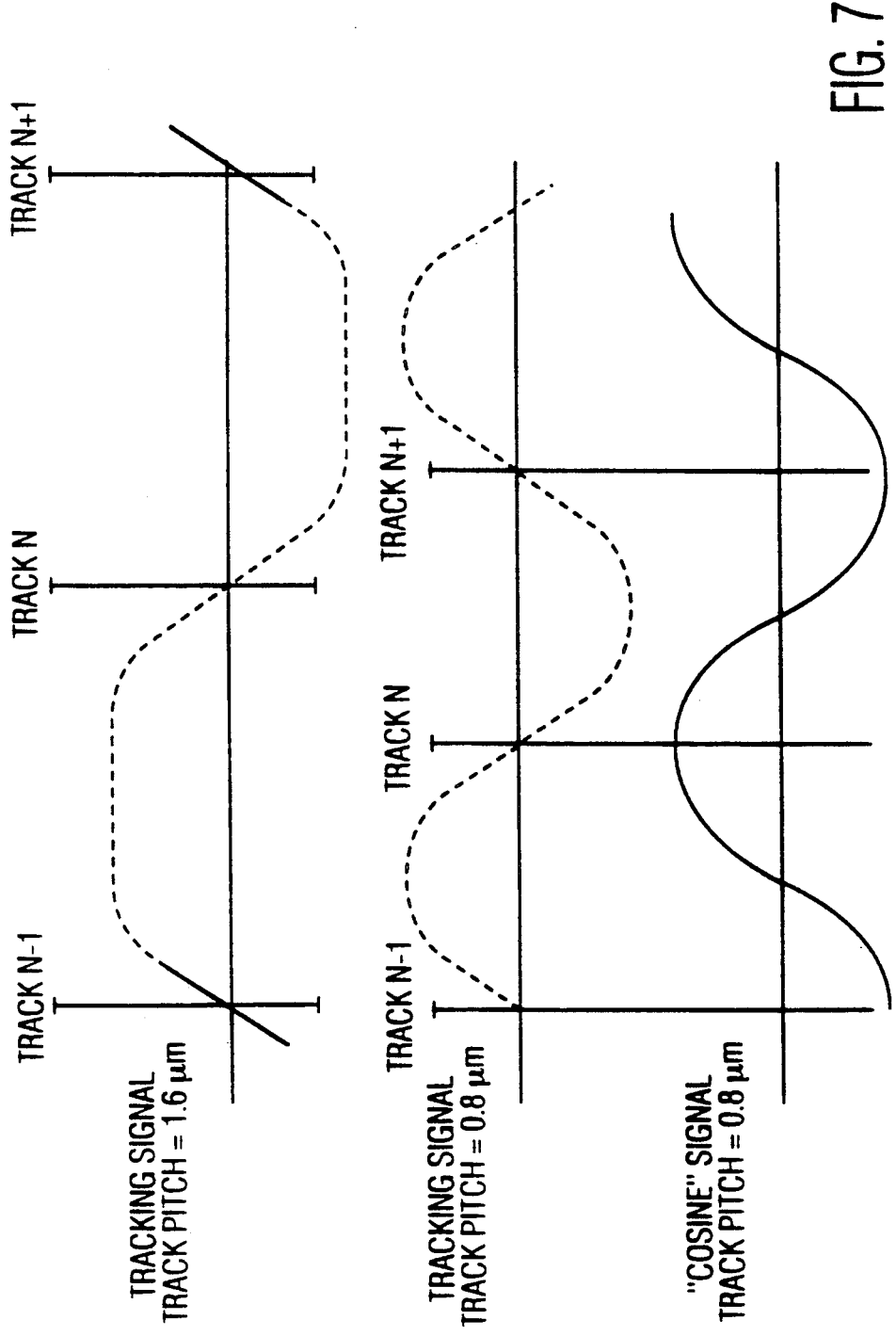
FIG. 7 illustrates the tracking signals produced when the wobbled pit track format shown in FIGS. 5A and 5B is used and the "cosine" signal produced by the "cosine" pits when the track pitch is 0.8 μm.

With reference to FIG. 7, the tracking signals produced when utilizing the wobbled pit portion of the track format of the present invention for the two different track pitches illustrated in FIGS. 5A and 5B are shown. Noticeably, the slopes of the tracking signal at the zero-crossing points for a track pitch of 0.8 μm are substantially the same as that for the tracking signal produced when the track pitch is 1.6 μm. The substantially constant slopes of the tracking signals at the zero-crossing points for a range of track pitches results in the tracking servo loop having a substantially constant gain over the range of track pitches. This, in turn, enhances the stability of the tracking servo loop and reduces the need for any compensating gain circuitry. The substantially constant slope of the tracking signal at the zero-crossing point is primarily attributable to the constant offset of the wobbled pits relative to the track center regardless of the track pitch.

The tracking signals produced using the wobbled pit track format of the present invention also have a substantially constant amplitude over the range of track pitches extending from 0.8 μm to 1.6 μm. The constant amplitude of the tracking signal over a range of track pitches is primarily attributable to the sequence of tracking wobbled pits, i.e., the different sequence of wobbled pits between adjacent tracks.

With continuing reference to FIG. 7, the processing circuitry 32 is also designed to generate a "cosine signal" based on the interaction of the laser beam with the "cosine" pits 20 as the laser beam is radially displaced across the concentric tracks 12. The "cosine signal" is 90° out of phase with the tracking signal produced using the wobbled pits. The 90° phase difference between the "cosine signal" and the tracking signal can be used to determine which direction the laser beam is moving relative to the optical disk, i.e., radially inward or radially outward. More specifically, the information provided by the "cosine" signal and the tracking signal can be used to implement a phase quadrature technique that determines which direction, radially, the laser beam is being displaced relative to the disk.

Figure 8:
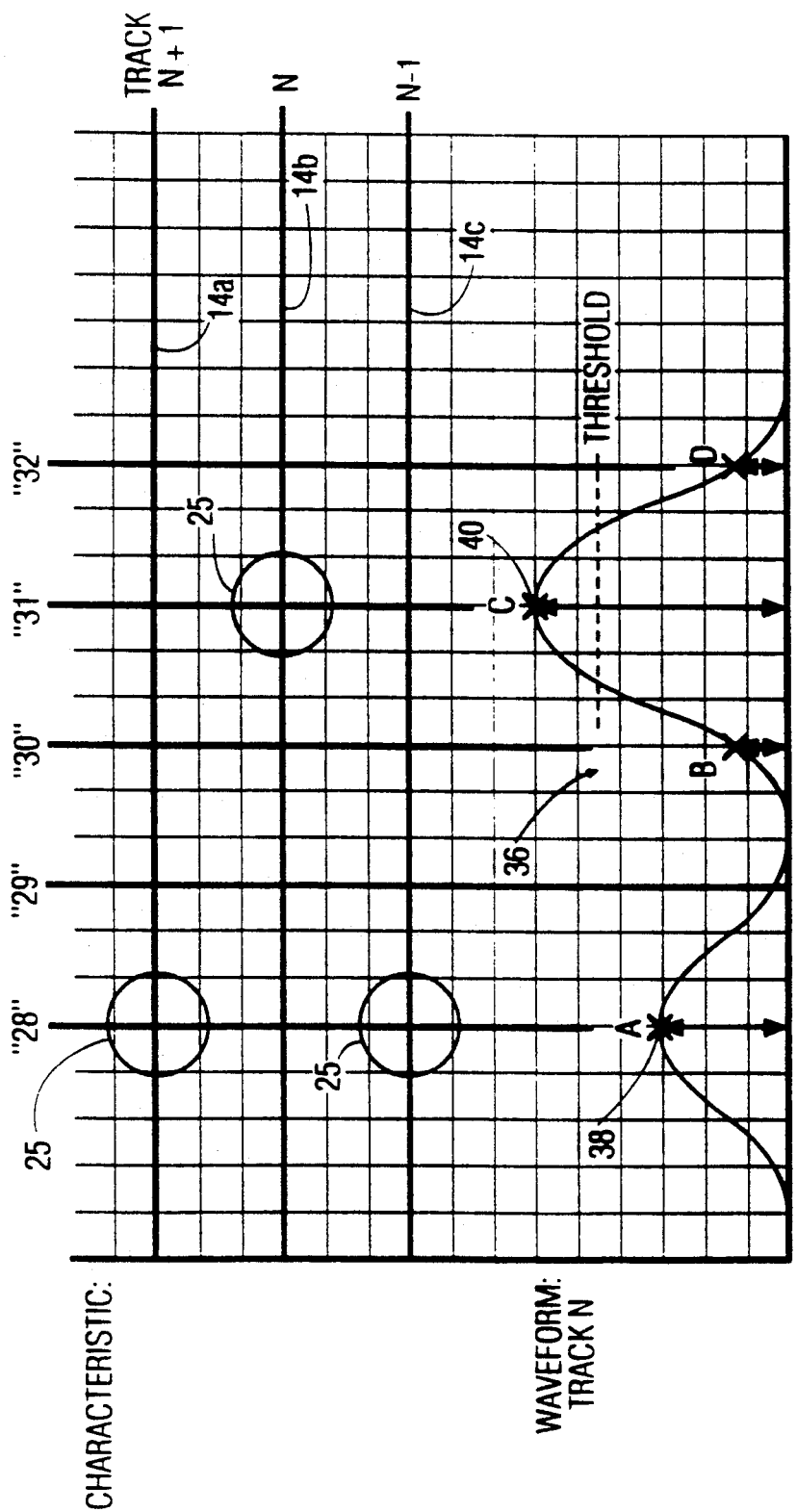
FIG. 8 illustrates the reference marks for tracks N+1, N, and N−1 and the reference signal produced using track N.

FIG. 8 illustrates the waveform 36 generated by the processing circuitry 32 when the laser beam traverses the portion of track 14b where the reference mark 25 is located and adjacent to which the reference marks 25 associated with tracks 14a and 14c are located. When the laser beam traverses the portion of the track 14b adjacent to which the reference marks 25 that are associated with tracks 14a and 14c are located, a first peak 38 of the waveform 36 is produced by the processing circuitry 32. The first peak 38, since there is no mark established on the track 14b at this point, is indicative of, or closely approximates, the maximum radial interference that can be produced by marks on tracks 14a and 14c when user data is read from track 14b. Consequently, the threshold for detecting a mark of user data on track 14b must be greater than the level of the first peak. The maximum radial interference may, however, be somewhat greater due to flaws in the optical media, for example. When the laser beam traverses the portion of the track 14b where its reference mark 25 is located, a second peak 40 of the waveform 36 is produced by the processing circuitry 32. The second peak 40, since there are no marks established on the adjacent tracks 14a and 14c at the point it is produced, is indicative of the signal that is expected to be produced by a mark of user data in the absence of radial interference. Consequently, the second peak 40 approximates the minimum signal that would be produced by a mark of user data. If the reference pits were radially aligned, the second peak would have a greater amplitude due to the radial interference contribution of the reference marks on the adjacent tracks 14a and 14c. The signal produced by a mark of user data may, however, be somewhat less than the second peak 40 due to flaws in the recording media and the like. Consequently, the first peak 38 and the second peak 40 define the levels between which the threshold level used by the read circuitry to determine whether or not a mark of user data has been read should be established. The approximation of the maximum radial interference, the first peak 38, and the approximation of the minimum signal associated with a user data mark, the second peak 40, obtained by alternating the location of the reference marks 25 from track to track allows an optimal threshold level for a CAV system with a changing track pitch to be determined. Specifically, the optimal threshold level is:

$$T = C - ((C - A - B) * \alpha)$$

where "C" is the second peak 40 level, "A" is the first peak 38 level, "B" is level of the waveform 36 at pit location "30" and approximates the tangential interference expected when reading a user data pit, and $\alpha$ is a proportionality constant that is greater than zero but less than 1. Point "D" is the level at pit location "32". If the "B" is not substantially equal to "D", then there is a phase error in the channel clock. If, on the other hand, "B" is substantially equal to "D", then the phase of the channel clock is optimal.

Figure 9:
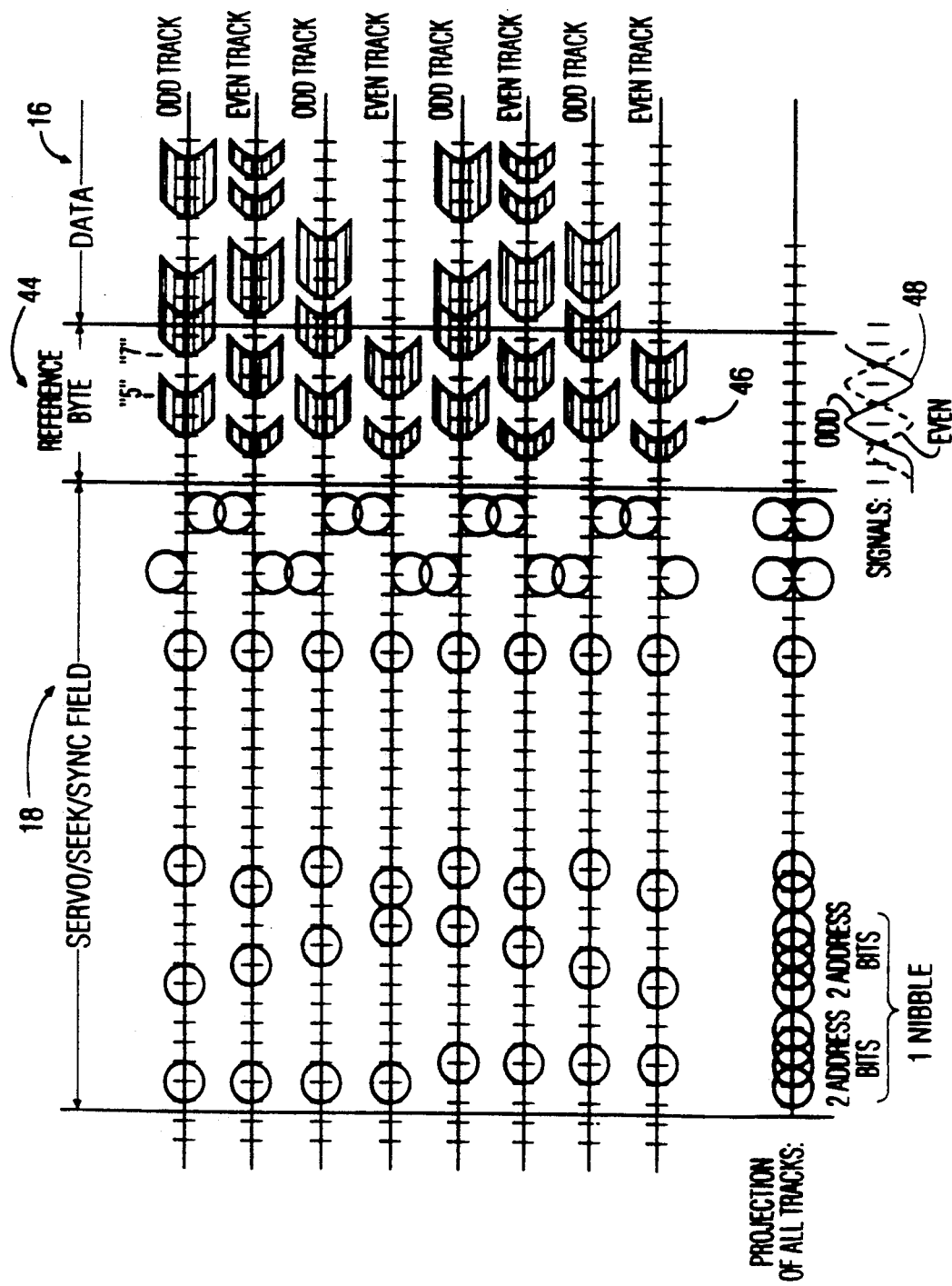
FIG. 9 illustrates an alternative embodiment of the reference marks.

FIG. 9 shows an alternative embodiment of the alternating or staggered reference marks that can be used in a partial response detection system. The servo field 18 includes a reference byte 44 that includes a pattern of marks 46 that is established at the same time user data is established in the data field 16 and that alternates between tracks. When the laser beam traverses the reference byte of, for example, an "odd" track a signal 48 is produced that can be used to establish the two, optimal threshold levels necessary for what is known as a partial response system. Phase error in the channel clock is indicated by a difference in the portions of the signal 48 corresponding to locations "5" and "7" of the reference byte 44. On the other hand, if the portions of the signal 48 corresponding to location "5" and "7" are substantially equal, then the phase of the channel clock is optimal.

The foregoing description of the invention has been presented for purposes of illustration and description. Further, the description is not intended to limit the invention to the form disclosed therein. Consequently, variations and modifications commensurate with the above teachings, and the skill and knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. An optical record carrier having information storage areas arranged in a multiplicity of tracks arranged for scanning by an apparatus having a tracking servo means for controlling a scanner to scan along a selected track, wherein said tracks are substantially parallel to each other and are unequally spaced over a range of track pitches,
   each track has a respective center line, at least one preformatted side mark offset from said center line in a first direction, and at least another preformatted side mark longitudinally displaced along said track and offset from said center line in a second direction opposite said first direction,
   a first, second and third of said tracks are disposed consecutively adjacent each other, with the track pitch between said first and second tracks being different from the track pitch between said second and third tracks,
   characterized in that, with respect to a reference point defined in each track by a line extending substantially perpendicularly to said tracks, each track has a respective reference mark recorded on the respective track at a time subsequent to the preformatting, and substantially located on the respective track center line, the respective reference marks of said first and third tracks being located a first longitudinal distance from their respective reference points, and the reference mark of said second track being located a second longitudinal distance, different from said first longitudinal distance, from the second track reference point, the difference between said first and second longitudinal distances constituting a first longitudinal offset distance,
   in said first, second and third tracks the first of the side marks are located substantially a same third longitudinal distance from the respective reference point,
   the respective one side marks are each offset from the respective center lines by a first radial distance, and the respective another side marks are each offset from the respective center lines by a second radial distance.

2. A carrier as claimed in claim 1, characterized in that said first radial distance is substantially equal to said second radial distance,
   with respect to the respective reference point, in said first track the first of said one side marks precedes the first of said another side marks, and in said second track the first of said another side marks precedes the first of said one side marks,
   a line extending from said first of said one side marks in said first track to said first of said another side marks in said second track extends substantially perpendicularly to said first and second tracks,
   with respect to said respective reference point, each track has a respective first center mark substantially located on the respective track center line, the respective first center marks of said first and third tracks being located a third longitudinal distance from their respective reference points, and the first center mark of said second track being located a fourth longitudinal distance, different from said third longitudinal distance, from the second track reference point, the difference between said third and fourth longitudinal distances constituting a second longitudinal offset distance, and
   said first longitudinal offset distance is greater than said second longitudinal offset distance.

3. A carrier as claimed in claim 2, wherein said carrier is a disc, and said tracks are substantially concentric circular tracks,
   in a direction of scanning along said tracks, said reference marks follow after said preformatted mark, and
   said first longitudinal offset distance has a value at least approximately equal to the minimum track pitch.

4. A carrier as claimed in claim 1, characterized in that, with respect to the respective reference point, in said first track the first of said one side marks precedes the first of said another side marks, and in said second track the first of said another side marks precedes the first of said one side marks.

5. A carrier as claimed in claim 1, characterized in that a line extending from a first of said side marks in said first track to a first said side marks in said second track extends substantially perpendicularly to said first and said second tracks.

6. An optical record carrier system, comprising an optical record carrier having information storage areas arranged in a multiplicity of tracks, and an optical beam scanning apparatus having a tracking servo means for controlling a scanner to scan along a selected track, wherein said tracks are substantially parallel to each other and are unequally spaced over a range of track pitches, each track has a respective center line, at least one preformatted side mark offset from said center line in a first direction, and at least another preformatted side mark longitudinally displaced along said track and offset from said center line in a second direction opposite said first direction, said scanner comprises means for generating a radiation beam, for directing said beam to said record carrier, for receiving from said record carrier a modulated radiation beam, and for generating a tracking error signal responsive to modulated radiation from said side marks, a first, second and third of said tracks are disposed consecutively adjacent each other, with the track pitch between said first and second tracks being different from the track pitch between said second and third tracks, characterized in that, with respect to a reference point defined in each track by a line extending substantially perpendicularly to said tracks, each track has a respective reference mark recorded on the respective track at a time subsequent to the preformatting, and substantially located on the respective track center line, the respective reference marks of said first and third tracks being located a first longitudinal distance from their respective reference points, and the reference mark of said second track being located a second longitudinal distance, different from said first longitudinal distance, from the second track reference point, the difference between said first and second longitudinal distances constituting a first longitudinal offset distance, in said first, second and third tracks the first of the side marks are located substantially a same third longitudinal distance from the respective reference point, the respective one side marks are each offset from the respective center lines by a first radial distance, and the respective another side marks are each offset from the respective center lines by a second radial distance, whereby said tracking error signal has a substantially constant slope at its zero-crossing point for the different track pitches.

7. A system as claimed in claim 6, characterized in that said first radial distance is substantially equal to said second radial distance, with respect to the respective reference point, in said first track the first of said one side marks precedes the first of said another side marks, and in said second track the first of said another side marks precedes the first of said one side marks, a line extending from said first of said one side marks in said first track to said first of said another side marks in said second track extends substantially perpendicularly to said first and second tracks, and in a direction of scanning along said tracks, said reference marks follow after said preformatted marks.

8. A system as claimed in claim 7, wherein said carrier is a disc, said tracks are substantially concentric circular tracks, and said first longitudinal offset distance has a value at least approximately equal to the minimum track pitch.

9. A system as claimed in claim 7, characterized in that a line extending from a first of said side marks in said first track to a first of said side marks in said second track extends substantially perpendicularly to said first and said second tracks.

10. A system as claimed in claim 7, characterized in that with respect to said respective reference point, each track has a respective first center mark substantially located on the respective track center line, the respective first center marks of said first and third tracks being located a third longitudinal distance from their respective reference points, and the first center mark of said second track being located a fourth longitudinal distance, different from said third longitudinal distance, from the second track reference point, the difference between said third and fourth longitudinal distances constituting a second longitudinal offset distance, said first longitudinal offset distance is greater than said second longitudinal offset distance, and said apparatus comprises means for producing a periodic signal, responsive to scanning of the respective first center marks of said first and second tracks, that is substantially 90° out of phase with the periodic tracking error signal.

* * * * *